March 29, 1949. M. A. WACHS 2,465,701
OVERRUNNING CENTRIFUGAL CLUTCH
Filed Oct. 17, 1945

MILLER A. WACHS
INVENTOR

BY Gifford L. Holmes
AGENT

Patented Mar. 29, 1949

2,465,701

UNITED STATES PATENT OFFICE 2,465,701

OVERRUNNING CENTRIFUGAL CLUTCH

Miller A. Wachs, Devon, Conn., assignor to United Aircraft Corporation, East Hartford, Conn., a corporation of Delaware Application October 17, 1945, Serial No. 622,794

3 Claims. (Cl. 192—105)

This invention relates to power transmission means, for example, in a helicopter drive; and more particularly to a clutch that provides both for power transmission and for permitting overrunning of the output element with respect to the power source.

An object of this invention is to provide an improved centrifugally operated overrunning clutch.

It is another object in keeping with the preceding object to provide an improved clutch of light weight and rugged structure for use in aircraft, and more particularly in aircraft of the type known as helicopters.

A further object is to combine the functions of an impositive clutch with a centrifugal clutch in a structure having low weight and hence a high ratio of capacity to weight.

The foregoing and other objects including the details of construction and arrangement of parts will be either obvious or pointed out in the following specification and claims.

Figure 1:
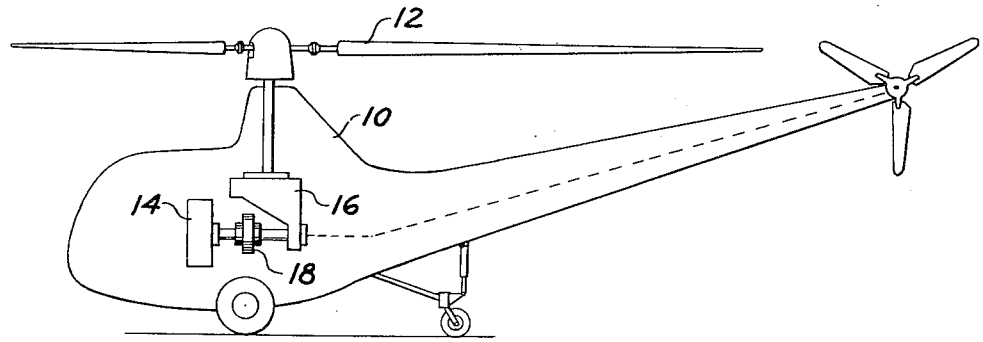
Fig. 1 is a diagrammatic view showing my invention in a helicopter.

In Fig. 1, a helicopter 10 is provided with a sustaining rotor 12 driven by an engine 14. A gear reduction mechanism 16 is interposed between the rotor 12 and the engine 14 to reduce the speed of the rotor with respect to the engine. A clutch 18 of the centrifugal type and having overrunning attributes is placed in the shaft between the engine and the gear reduction mechanism 16. It will be understood that the clutch 18 could be placed at other positions in the driving connection from the engine 14 to the rotor 12 to perform the same function. However, in the instant application, it is preferable to place the clutch 18 in the high speed, low torque shaft driven by the engine 14 so that the weight of parts can be kept at a minimum.

Figure 2:
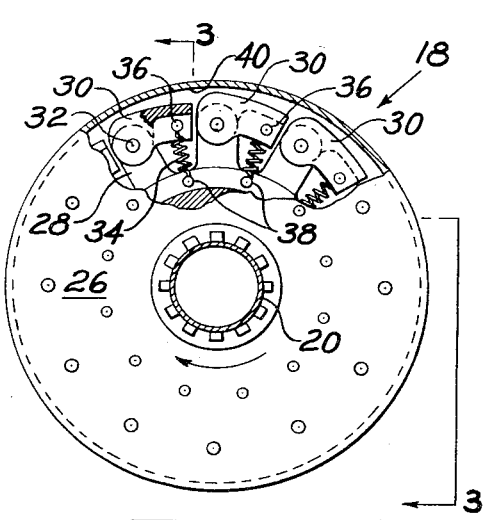
Fig. 2 is a view of one face of the overrunning clutch with parts in section to show the details of construction.
Figure 3:
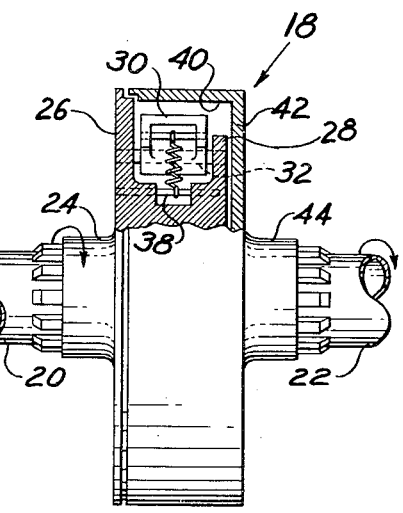
Fig. 3 is a partial sectional view taken along the lines of 3—3 in Fig. 2.

In Figs. 2 and 3 a driving shaft 20 operates through the clutch mechanism 18 to turn a shaft 22. The shaft 20 is splined into a hub 24 that is shown as formed integrally with a driving web 26 of the clutch 18. The web 26 is connected with radially arranged ears 28 into the ends of which clutch shoes 30 are mounted by pivots 32. Springs 34 are connected by pivots 36 on the shoes 30 and pins 38 carried at the web 26. The springs 34 urged the shoes 30 away from the interior surface 40 of a driven bell 42 formed integrally with a hub 44 splined to the output shaft 22.

The structure described above rotates in a clockwise direction as viewed in Fig. 2, and upon starting up the engine 14 the shaft 20 will turn the web 26 and the shoes 30, and the shoes will tend to rotate outwardly around the pivots 32 due to centrifugal force against the tension of the springs 34. The tension of the springs 34 may be such as to prevent engagement of the shoes 30 with the surface 40 until a predetermined desired speed of the engine 14 is attained. When such a speed is attained, the outer friction surfaces of the shoes 30 will engage the inner surface 40 of the bell 42 and the friction between these surfaces will cause torque to be transmitted from the input shaft 20 to the output shaft 22. This will cause the output shaft to accelerate to the speed of the input shaft and additional speed will urge the shoes 30 into still more intimate contact with the surface 40 because of centrifugal force.

As best shown in Fig. 2, the shoes 30 will be self-energizing, due to the direction of rotation of the several parts of the clutch 18 and the location of the pivots 32 of the surface 30 below engaging surfaces thereof. The extent of such action is predetermined by the coefficient of friction of the shoes 30 with respect to the surface 40, and the location of the pivots 32, and the tension of the springs 34. By different slightly modified arrangements of the related parts, for different uses for the clutch, desired amounts of self energization can be obtained.

If the helicopter 10 is in flight and the engine 14 fails, it is desirable that the rotor 12 be free to rotate without turning over the engine 14 which may be damaged to such an extent that its resistance to turning may be very high. When the output bell 42 tends to rotate more rapidly than the web 26 of the clutch 18, the shoes 30 will be rotating in a clockwise direction around the pivots 32 which rotation will separate the surfaces of the shoes 32 from the surface 40. By such action, the rotor 12 will not need to rotate the engine and can overrun the speed of the engine.

Figure 4:
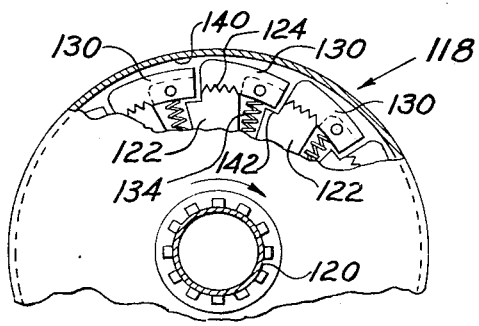
Fig. 4 is a view of a modified construction.

In Fig. 4 a modified construction is shown wherein the mounting pivots have been eliminated and a toothed surface is provided for mounting the shoes. The clutch 118 is driven by a shaft 120 which connects to arms 122 having toothed extremities 124. Shoes 130 have toothed inner surfaces, and smooth outer surfaces which are formed to engage in inner surface 140 of an output bell connected to an output shaft, not shown. Springs 134 are connected with the shoes 130 and exert a predetermined tension thereon in opposition to centrifugal force so that the shoes 130 will engage the surface 140 after a predetermined speed of rotation of the engine shaft 120 is attained. When the shoes 130 engage the surface 140, the shoes will ride slightly upward upon the teeth 124 to render the clutch 134 self energizing to an extent determined by the location of the springs 134, the location of the teeth, slope of the teeth 124, and the friction between the engaging surfaces. Shoulders 142 are provided to limit the downward travel of the shoes 130 when the input shaft 120 is rotating at low speeds, or is stopped.

When the output shaft turned through the clutch 118 exceeds the speed of the input shaft 120, the surface 140 will move the shoes toward the right with respect to the extensions 122 and rotate them around the teeth 124 to disengage the clutch surfaces. Thus, this modification also provides an overrunning feature for a centrifugal clutch.

While I have shown and described two forms that my invention may take, it may be understood that other modifications thereof may occur to those skilled in the art. For example, it would be obvious to vary the size, shape and numbers of the friction shoes, and also to modify the overall diameter of the device to attain lower weight for the amount of power transmitted. For these reasons, I wish not to be limited in my invention only to those forms shown and described but by the scope of the following claims.

I claim:

1. An impositive centrifugal friction clutch comprising in combination, an input member, an output member, a surface on said output member for transmitting torque, toothed surfaces upon said input member, and a plurality of members carried upon said toothed surfaces, and operable by centrifugal force in response to the rotation of said input member for transmitting torque from said input member to said surface, said plurality of members being self energizing by riding upward on said toothed surfaces to increase the torque transfer capacity of the clutch when the power to the input member increases, and incapable of transferring torque back from said output member to said input member when the speed of the output member exceeds the speed of the input member.

2. An overrunning centrifugal clutch comprising in combination, an input member, an output member, and means connecting said input and output members in response to a centrifugal force including, a plurality of friction shoes having a toothed mounting upon said input member, a surface on said output member, said mountings for said shoes being spaced from said surface for causing them when rotated to have a wedging action against said surface, and resilient means biasing said shoes away from said surface.

3. An overrunning clutch comprising in combination, an input member, an output member having a surface, and means including a plurality of shoes responsive to centrifugal force and having friction surfaces for engaging said surface, each of said shoes having a mounting on said input member, the friction between said surfaces and said surface transferring the torque from said input member through said mountings to said output member but not from said output member to said input member.

MILLER A. WACHS.

REFERENCES CITED

The following references are of record in the file of this patent:

UNITED STATES PATENTS

| Number | Name | Date |
| --- | --- | --- |
| 1,870,644 | Pitter | Aug. 9, 1932 |
| 1,878,824 | Dodge | Sept. 20, 1932 |
| 2,375,909 | Fawick | May 15, 1945 |

FOREIGN PATENTS

| Number | Country | Date |
| --- | --- | --- |
| 441,436 | France | May 24, 1912 |